United States Patent [19]

Zenno et al.

[11] 4,102,783

[45] Jul. 25, 1978

[54] ADSORBENT PROCESS FOR OILY MATERIALS

[75] Inventors: Akira Zenno; Toshiaki Uebayashi, both of Himeji; Isamu Maruyama, Tatsuno; Hidehiro Shiono, Himeji, all of Japan

[73] Assignee: Daicel Ltd., Sakai, Japan

[21] Appl. No.: 748,445

[22] Filed: Dec. 8, 1976

[30] Foreign Application Priority Data

Dec. 8, 1975 [JP] Japan ............................... 50-146597
Mar. 27, 1976 [JP] Japan ............................... 51-33833
Jun. 24, 1976 [JP] Japan ............................... 51-75168

[51] Int. Cl.$^2$ .............................................. C02B 9/02
[52] U.S. Cl. ...................................... 210/36; 210/40; 210/DIG. 26
[58] Field of Search .................... 210/36, 40, 242 AS, 210/DIG. 26

[56] References Cited

U.S. PATENT DOCUMENTS 3,739,913   6/1973   Bogosian ..................... 210/DIG. 26

OTHER PUBLICATIONS

Little, Arthur D. *Combating Pollution Created by Oil Spills* VI, Report to the Dept. of Transportation U.S. Coast Guard, Jun. 1969, p. 61.

*Primary Examiner*—Charles N. Hart
*Assistant Examiner*—Ivars Cintins

[57] ABSTRACT

An adsorbent used for effectively collecting or removing oily materials floating on water or emulsified or dispersed in water composed mainly of unrefined lints or unrefined linters together with, if necessary, filter papers, synthetic fibers, or natural fibers as a mixture thereof.

20 Claims, No Drawings

ADSORBENT PROCESS FOR OILY MATERIALS

BACKGROUND OF THE INVENTION

1. Field of the Invention

The present invention relates to an adsorbent for oily materials mainly comprising unrefined lints (hereinafter, referred to as crude lints) or unrefined linters (hereinafter, referred to as crude linters) having high water repellency and a high oil adsorptive function for collecting or removing oily materials floating on the surface of the water or oily materials emulsified or dispersed in water as well as oily solvents insoluble in water.

The invention further relates to a process of treating oil-containing waste water using the above-described adsorbent.

2. Description of the Prior Art

When oils, in particular, mineral oils are present in rivers or public water reservoirs, they contaminate the water and damage greatly sources for aquatic or marine products in river basins and the coasts near rivers.

Thus, to prevent the occurence of such damage by water pollution, regulations on waste water have become quite strict and countermeasures have been provided, when by any chance oil-containing waste water flows into a river, that oily materials are collected or recovered as quickly as possible to prevent these oily materials from spreading over the river.

As countermeasures for preventing the spreading of oily-materials which have flowed into a river, various methods have been proposed and one of the most effective methods is a method in which an adsorbent for oily materials is effectively utilized.

Hitherto, as the adsorbents for oils floating on the surface of the water, regenerated celluloses comprising mixtures of various pulps and rayon; fibers comprising a synthetic polymer such as polypropylene, polystyrene, polyurethane, etc.; or sponges are mainly used and as adsorbents for fine oil droplets dispersed in water, synthetic fibers comprising a hydrocarbon polymer such as polypropylene, etc., are mainly used.

However, regenerated celluloses have the disadvantages that an adsorbent comprising such regenerated celluloses are expensive since they must be treated to render them water repellent due to the high hydrophilic property of these materials and these regenerated celluloses do not always have good oil adsorption properties. Also, oil adsorbents comprising synthetic fibers have various difficulties in practical use since they have a low adsorption retention for low viscosity oils, they generate a large amount of heat on incineration, which causes difficulties, they do not retain their structural form depending on the solvents contained in the waste water to be treated, and also the cost of the synthetic fibers is high.

As mentioned above, oil adsorbers reserved for countermeasures for leakage of oily materials at present have various disadvantages from the standpoint of their properties as well as cost and adsorbents which sufficiently overcome these difficulties have not yet been developed.

SUMMARY OF THE INVENTION

As the result of various investigations to find oil adsorbents which have a high oil adsorption, have a high solvent resistance, are easily available at low cost in large quantities, and do not give rise to secondary pollution in incineration or other post treatments after use, it has now been found that crude lints or crude linters recovered from cotton seed which have not been subjected to any additional treatment are excellent and desired oil adsorbers since they have a very high oil-adsorption capability for heavy oils, etc., and have an appropriate water repellency as oil adsorbents, in other words, they have balanced properties suitable as oil adsorbents due to an appropriate amount of fats and oils contained in them, and they are available at low cost, and based on this discovery, the present invention has been attained.

That is, there is first provided an adsorbent for oily materials comprising crude lints or crude linters as the main components.

There is also provided an adsorbent for oily materials comprising a combination or a mixture of crude lints or crude linters as the main component and filter papers or synthetic, semi-synthetic, or natural fibers as an additional component.

According to this invention, there is provided a process of treating oil-containing waste water which comprises treating the oil-containing water with an oil adsorbent containing crude lints or crude linters as the main components.

DETAILED DESCRIPTION OF THE INVENTION

In this invention, the crude lints or crude linters may be used as they are as the oil adsorbent or they may be used as a mixture thereof with about 5 to about 50% by weight refined natural fibers, thermoplastic synthetic fibers, and/or semi-synthetic fibers (hereinafter, simply "fibers"). These materials are mainly formed into a mat, a strand, etc., of the fibrous mixture, and are used for removing by adsorption oily materials floating on the surface of the water. When the crude lints or crude linters or a mixture of the crude lints or crude linters and the above-described fibers is used for separating by adsorption oily materials present in water in an emulsified state or dispersed state, the oil adsorbent can be used in the form of a fixed bed or a fluidized state.

Lints are the long fibers firstly recovered from cotton seed using a cotton gin, are the so-called cotton wool and are formed into spun yarns and fabrics in a fibrous state using a cotton system spinning machine.

However, the cotton seed from which the lints have been recovered further contains short fibers and thus by treating them once or twice using a linter machine, the short fibers can be also recovered from the cotton seed. The short fibers thus recovered are called linters.

The external appearance of the lints and linters are shown in Table 1 below.

TABLE 1

| Characteristic | Linters | Lints |
|---|---|---|
| Color | Olive color | Light olive color |
| Length | 2/8–3/8 inch | 5/8–3/2 inches |
| Surface | Smooth | Fairly smooth |
| Structure of cell, wall | Thick wall, narrow lumen, and circle-like cross section | Thin wall, broad lumen, and somewhat circle-like cross section |
| Other | | The mat prepared from lints have high tensile strength. A bulk mat can be produced. |

As shown in the above table, the length of the crude lints is longer than that of the crude linters and the mat prepared from crude lints has a high tensile strength since a single fiber of the crude linter has many twists. Furthermore, the lumen of the single fiber of the crude lint is larger than that of the crude linters and the voids of the single fiber of the crude lint are higher than those of the crude linters and, also, the oil-adsorption capability of the crude lints is higher than that of the crude linters. Accordingly, the crude lints can be more effectively used as an adsorbent than the crude linters.

In particular, in using the crude lints, the waste cotton formed in cotton spinning can be preferably used as the oil adsorbent.

The adsorbent for oily materials of this invention is described below in detail.

As used herein, untreated natural fibers are considered to be "unrefined fibers" (e.g., unrefined or crude lints or unrefined or crude linters). As a result, the term "refined natural fibers" is intended to describe a crude or unrefined natural fiber which has been subjected to some treatment, which generally changes the water repellency thereof such that the water repellency is lower than that of unrefined or crude fibers or in other words the hydrophilic properties thereof are higher than that of unrefined or crude natural fibers. In particular, unrefined or crude lints or unrefined or crude linters in their natural state generally contain about 0.3 to about 3% by weight cotton wax. These unrefined or crude natural fibers can be subjected to a treatment such as steaming, bleaching or extracting to remove the cotton wax and to obtain refined natural fibers. As a result of this treatment, the content of cotton wax in the fiber is decreased and the water repellency is decreased. Throughout the specification, the terms "unrefined" or "crude" and "refined" will be used within the above context.

In using the crude lints or crude linters as an oil adsorbent, depending on the amount of the oil contained in waste water or which has flowed into a river, the fleece of the crude lints or the crude linters can be placed in a container made of a net and then added to the waste water in such a container, or a column can be filled with the fleece of the crude lints or the crude linters and the waste water passed through the column to separate the oily material from the waste water by adsorption, or further the crude lints or the crude linters having comparatively long fibers can be formed into strands or mats, which are then added directly to the waste water.

Furthermore, more desirably from a practical standpoint, the crude lints or crude linters are mixed with about 10 to about 30% by weight thermoplastic synthetic fibers or semi-synthetic fibers followed by fabrication and the fabricated fibrous mixture is added to the waste material or is used as a filter for the waste water.

When oily materials floating on waste water are removed by adding the oily material adsorbent of this invention to the waste water, if the mat of the adsorbent has a low tensile strength, there is concern that the form of the mat might be destroyed when the mat is allowed to stand in the waste water or during recovery of the mat after adsorbing the oily materials, which sometimes results in an ineffective recovery of the adsorbent.

Thus, in such a case, the fleece of the crude lints or crude linters contained in a net container can be used or a mat of the crude lints or crude linters reinforced with a binder can be used. In particular, when thermoplastic and thermosetting synthetic fibers or semi-synthetic fibers are mixed as a binder or reinforcing material with the crude lints or waste cotton, or further the crude linters in an amount of about 10 to about 30% by weight of the lints or linters, the cotton mixture thus obtained has the advantages that the cotton mixture has a very high oil-adsorption capability and a low water adsorption and has less concern as to secondary pollution as compared with a fibrous adsorbent mainly composed of synthetic fibers such as polypropylene fibers, etc. Thus, a cotton mixture can provide a very excellent oil adsorbent in this invention in practical use.

Moreover, when the filtering system using substantially only crude lints or crude linters is employed for removing or separating by adsorption dispersed oils or emulsified oils, the waste water does not permeate well into the filter layer since the crude lints or the crude linters have a very high water repellency and further this tendency increases as the specific volume of the mat increases. When the waste water is forcedly pressed into the filter layer in such a state, channelling occurs, whereby purification of the waste water sometimes cannot be performed effectively. On the other hand, refined natural fibers, such as refined linters, refined lints, refined pulps, etc., have a high hydrophilic property and thus when a small proportion of such refined natural fibers are mixed with the crude lints or crude linters, uniform permeation of the waste water into the filter layer can be promoted. On the other hand, synthetic fibers or semi-synthetic fibers such as polypropylene fibers and cellulose acetate fibers may be oleophilic but have lower water repellency than the crude lints and crude linters. Therefore, when such synthetic or semi-synthetic fibers are mixed with the crude lints or the crude linters, permeation of the waste water can be sufficiently promoted and in this case, a preferred result is obtained when the specific volume of the mat is adjusted to about 0.08 to about 0.20 g/cm$^2$.

If the synthetic fibers or the semi-synthetic fibers as described above are thermoplastic materials, they can be utilized as a heat bonding binder for a mat or strand mainly composed of the crude lints or crude linters for improving the strength of the mat or strand and for controlling the specific volume of the mat or strand, and the use of these synthetic or semi-synthetic fibers can prevent channelling from occurring.

In using the above-described synthetic fibers or semi-synthetic fibers as a binder for the crude lints or the crude linters as described above, if the proportion of the binder is lower than about 10% by weight, the strength of the filter layer formed is still low, while if the proportion is higher than about 30% by weight, the amount of oils adsorbed by the filter layer is reduced and also difficulties occur in incineration thereof.

Furthermore, in using the waste cotton formed in a cotton spinning step, the waste cotton only, or a cotton mixture of the waste cotton and about 10 to about 30% by weight synthetic or artificial fibers, or further a mixture of the waste cotton and the crude lints or crude linters can also be used as the oil adsorbent of this invention.

The filter layer materials used in the practice of this invention can be prepared in, for example, the following manner.

That is, in an embodiment of this invention, fibers mainly comprising crude lints or crude linters are collected while arranging the fibers in one direction to form a mat and the mat thus prepared is rigidly rolled up spirally with the longitudinal direction thereof as the axis to provide a columnar rod, which is cut perpendicular to the longitudinal axis of the rod at suitable intervals to form discs. One or several discs thus formed can be inserted in a cylindrical column or a column of the discs can be directly formed using the discs only.

In using the same volume of the fibers or the discs of the fibers prepared above in a column, to increase the efficiency of filtration and separation it is better to use a plurality of the discs stacked on each other as compared with the use of a single disc having the same volume as the stacked discs. Moreover, in using a plurality of the discs of the fibers stacked up, a particularly excellent effect in removing oils is obtained by using a filter paper or filter papers having voids of about 10 to about 70 microns, more particularly, linter filter papers as an interlayer between the discs or as a bottom layer of the piled discs since a breaking of the oil drop emulsion is performed by the filter paper. In addition, as the filter paper used for a breaking of the oil drop emulsion, any sheets of a hydrophilic material having voids of about 10 to about 70 microns can be used. For example, in addition to the above-described linter paper, a filter sheet composed of a general cellulose, partially acetalized polyvinyl alcohol, etc., may be also used.

The synthetic fibers or semi-synthetic fibers used in the oily material adsorbents of this invention as the binder for, at the same time, controlling the water repellency are fibers which are thermally weldable together. Preferred examples of these fibers are polypropylene fibers, polyethylene fibers, ethylene-vinyl acetate copolymer fibers, ethylene-propylene copolymer fibers, cellulose acetate fibers, etc. Of these fibers, ethylene-propylene copolymer fibers and ethylene-vinyl acetate copolymer fibers are particularly suitable in this invention.

In this invention, refined natural fibers are also used for controlling the water repellency of the oil adsorbents of this invention and examples of these natural fibers are refined linters, various refined pulps, viscose rayon staple fibers, refined lints, etc.

Mixing of the fibers to control the water repellency of the oil adsorbents of this invention also reduces the resistance of the oil-containing waste water to permeation through the oil adsorbent and further prolongs the life of the filter layer of the oil absorbent. Furthermore, as a binder for molding the crude linters or crude lints, powders of the above-described polymers as well as an emulsion type or solution type adhesive for non-woven fabric, such as an acrylic acid ester copolymer, a vinyl acetate copolymer, etc., each of which is thermally cross-linkable can be also used in addition to the above-described weldable fibers.

Still further, in removing oily materials emulsified or dispersed in water or sea water, water repellent natural cellulose fibers such as the crude lints and crude linters can be used in the form of loose fibers in this invention. That is, the loose fibers can be suspended in the waste water or sea water containing the oily materials and then the following steps are carried out successively;

(1) first, the oily materials in the waste liquid are adsorbed on the loose fibers, (2) water or sea water cleaned by floating separation or filtering separation is recovered, (3) the oily materials adsorbed on the fibers are then desorbed, and (4) the adsorbent or the loose fibers are regenerated. In this case, by automatically carrying out each step and the transition between the steps, a removal or separation of the oily materials can be very effectively performed.

In general, the properties required for oil adsorbents are as follows according to the regulations of the Ministry of Transportation of Japan:

(a) The adsorbed amount of Heavy Oil B by an oil adsorbent shall be above 6 g per gram of the oil adsorbent and above 0.8 g per cubic centimeter of the oil adsorbent.

(b) The adsorbed amount of water shall be below 1.5 g. per gram of the oil adsorbent and below 0.1 g per cubic centimeter of the oil adsorbent.

(c) The properties of the materials used for the oil adsorbent should not have a tendency to change when stored.

(d) The oil adsorbent shall not deposit when it is allowed to stand for a long period of time adsorbing oils and the oil adsorbent shall not undergo dimensional deformation and desorption of oil in such case.

(e) The oil adsorbent shall be easily recovered after use.

(f) The oil adsorbent can be incinerated and shall generate a low amount of noxious gases at incineration.

Thus, the advantages of this invention are as follows. That is, the oil adsorbents of this invention prepared using the crude lints, crude linters, or mats thereof have the following advantages.

(a) The oil adsorbents of this invention meet all of the requirements by the regulations of the Japanese Ministry of Transportation and have an oil adsorption capability of about 1.5 times that of conventional commercially available oil adsorbents.

(b) The costs of the materials are low.

(c) The oil adsorbents adsorb selectively oils only and adsorb water to only a small extent.

(d) The oil adsorbents do not deposit in water.

(e) Since the oil adsorbents are made of natural cellulose, they are not toxic and they do not cause secondary pollution and do not generate toxic gases at incineration.

(f) The oil adsorbents can maintain their original form for a long period of time when adsorbing oils.

(g) The oil adsorbents can be easily recovered after use.

(h) The oil adsorbents can be used again after being regenerated and hence are economically advantageous.

(i) The oil adsorbents are not dissolved in aromatic oils such as gasoline.

The invention is explained in more detail by the following examples but the invention shall not be construed as being limited only to the embodiments illustrated in the examples. Unless otherwise indicated, all parts, percents, ratios and the like are by weight.

EXAMPLE 1

Oily material adsorbents (Lint Mat A and Lint Mat B) of this invention were compared with commercially available oil adsorbents (Adsorbents L, T, and W) according to the quality test method for oil adsorbents defined by the regulations of the Japanese Ministry of Transportation, the results being shown in Table 2.

The compositions of the oil adsorbents used in this example are shown below together with those of the comparison examples:

Lint Mat A: 80% crude lints and 20% ethylene-vinyl acetate copolymer fibers.

Lint Mat B: 90% crude lints and 10% ethylene-propylene copolymer fibers.

Commercial Product L: Dry nonwoven fabric made of a fibrous synthetic resin.

Commercial Product T: Dry nonwoven fabric made of polypropylene fibers.

Commercial Product W: Another dry nonwoven fabric made of polypropylene fibers.

The amount of adsorbed oil and the amount of adsorbed water were measured in the following manner:

(1) Amount of Adsorbed Oil:

A test piece of an area of 10 cm × 10 cm was floated on the surface of Heavy Oil B at 20° C for 5 minutes and then after placing the test price on a metal netting having a mesh length of 1.7 mm made of a wire of 1 mm diameter for 5 minutes, the weight of the test piece was measured. Then, the amounts of the adsorbed oil per gram of the weight of the test piece and per cubic centimeter of the volume of the test piece were calculated respectively.

The standard Heavy Oil B used in the test had a specific gravity of 0.90 to 0.91 at 15° C and a kinematic viscosity of 15 to 30 CST (centistokes) (at 50° C).

In addition, in the calculation of the volume, the thickness of the test piece was measured under a load of 7 g per square centimeter.

(2) Amount of Adsorbed Water:

A test piece of an area of 10 cm × 10 cm was floated on the surface of the water at 20° C for 5 minutes and after placing on a metal netting having the same construction as the netting used in Test (1) above for 5 minutes, the weight of the test piece was measured. Then, the amounts of the adsorbed water per gram of the weight of the test piece and per square centimeter of the volume thereof were calculated respectively.

The results obtained are shown in table 2 below.

Table 2

| Adsorbent | Property of Mat | | | Amount of Oil | | Amount of Water | |
|---|---|---|---|---|---|---|---|
| | (A) g/m² | (B) cm | (C) g/cm³ | g/g | g/cm³ | g/g | g/cm³ |
| Lint Mat A | 538 | 0.97 | 0.06 | 18.00 | 1.08 | 0.150 | 0.0090 |
| Lint Mat A | 402 | 0.25 | 0.16 | 9.00 | 1.44 | 0.130 | 0.0108 |
| Lint Mat B | 350 | 0.54 | 0.07 | 20.50 | 1.44 | 0.030 | 0.0021 |
| Lint Mat B | 340 | 0.25 | 0.14 | 12.50 | 1.75 | 0.070 | 0.0098 |
| Commercial Product T | 400 | 0.40 | 0.10 | 10.25 | 1.03 | 0.244 | 0.0250 |
| Product L | 860 | 0.50 | 0.17 | 5.74 | 0.99 | 0.142 | 0.0206 |
| Product W | 800 | 1.00 | 0.08 | 9.00 | 0.72 | 0.087 | 0.0100 |
| Standard | — | — | — | above 6.0 | above 0.8 | below 1.5 | below 0.1 |

(A): Basis weight
(B): Thickness
(C): Density

From the results shown in the above table, it can be understood that the oil adsorbents of this invention are superior to commercial products in oil adsorption capability and low water adsorption properties.

EXAMPLE 2

To a one liter beaker containing about 500 ml of water was added 200 ml of gasoline or benzene to provide a specimen of contaminated (waste) water. Each of the test pieces (area: 5 cm × 5 cm) of the oil adsorbents as used in Example 1 was immersed in the waste water and the amount of the nonaqueous material floated on the surface of the water adsorbed on the test piece was measured. The results obtained are shown in Table 3 and Table 4 below.

The adsorbed amount of the nonaqueous material was measured as follows; that is, after the entire surface of the test piece was saturated with the contaminated water, the test piece was withdrawn, a metal netting was placed thereon for one minute, and then the weight of the test piece was accurately measured, from which the adsorbed amount of nonaqueous material per gram of the test piece was calculated.

Table 3

| Adsorbent | Property of Mat | | | Adsorbed Amount of Benzene |
|---|---|---|---|---|
| | (A) g/m² | (B) cm | (C) g/cm³ | g/g |
| Lint Mat A | 500 | 0.40 | 0.12 | 100 |
| Lint Mat A | 512 | 0.60 | 0.09 | 130 |
| Lint Mat B | 550 | 0.46 | 0.12 | 75 |
| Lint Mat B | 600 | 0.67 | 0.09 | 120 |
| Commercial product T | 390 | 0.40 | 0.10 | 90 |
| Product L | 845 | 0.50 | 0.17 | 31 |
| Product W | 835 | 1.00 | 0.08 | 88 |

Table 4

| Adsorbent | Property of Mat | | | Adsorbed Amount of Gasoline |
|---|---|---|---|---|
| | (A) g/m² | (B) cm | (C) g/cm³ | g/g |
| Lint Mat A | 525 | 0.40 | 0.13 | 7.05 |
| Lint Mat A | 450 | 0.56 | 0.08 | 10.00 |
| Lint Mat B | 600 | 0.50 | 0.12 | 6.10 |
| Lint Mat B | 650 | 0.81 | 0.08 | 10.05 |
| Commercial Product T | 400 | 0.40 | 0.10 | 4.80 |
| Product L | 610 | 0.51 | 0.12 | 3.00 |
| Product W | 900 | 0.90 | 0.10 | 5.50 |

(Note):
(A), (B), and (C) in Tables 3 and 4 have the same meaning as in Table 2.

As is clear from the results shown in the two tables above, the oil adsorbents of this invention had very high oil adsorption capability as compared with the commercial products.

EXAMPLE 3

Samples of water containing 130 p.p.m., 800 p.p.m., and 2100 p.p.m., respectively, of Heavy Oil A were stirred for one minute using a homogenizer at a speed of 700 r.p.m. to forcibly disperse the oil and using the dispersions as the samples of waste water, the cleaning power of oil adsorbents was tested.

The waste water was treated in the following manner; that is, each of the oil adsorbents as shown in Table 5 was placed on a support in a porcelain column of a diameter of 130 mm and 1000 ml of the sample of waste water was passed through the oil adsorbent as a filter layer.

The content of the oil in the treated water was measured according to the measurement for n-hexane extracted materials as shown in JIS K 0102 "Industrial Waste Water Test Method". The results obtained are shown in Table 5.

The oil adsorbents used in this example were the same as those used in Example 1. The following adsorbent was also used additionally in this example.

Lint Mat C: 80% crude lints and 20% ethylene-propylene copolymer fibers.

The oil adsorbent shown as "Lint Mat/Linter Paper" in the same table was a filter layer prepared by placing first a linter paper (weight: 227 g/m³; thickness: 0.07 cm; and density: 0.32 g/cm³, made by Daicel K.K.) on the support in the column and placing the lint mat on the linter paper.

Also, the oil adsorbent shown as "Lint Mat/Linter Paper/Lint Mat/Linter Paper" in the table was a filter layer prepared by further placing a lint mat and then the linter paper on the above described filter layer.

The standard Heavy Oil A used in the test had a specific gravity of 0.83 to 0.84 at 15° C and a kinematic viscosity of 2.5 to 15 CTS (centistokes) (at 50° C).

Table 5

| Adsorbent | Property of Mat | | | Filtration Treatment | |
|---|---|---|---|---|---|
| | (A) g/m² | (B) cm | (C) g/cm³ | (D) ppm | (E) ppm |
| Lint Mat A | 570.0 | 0.71 | 0.08 | 130 | 9.5 |
| Lint Mat B | 575.0 | 0.72 | 0.08 | 130 | 3.0 |
| Lint Mat B | 571.0 | 0.38 | 0.15 | 130 | 6.0 |
| Lint Mat C | 570.0 | 0.71 | 0.08 | 130 | 2.5 |
| Lint Mat C | 600.0 | 0.40 | 01.5 | 130 | 5.1 |
| Lint Mat C/ Linter Paper | 3000.0 | 3.75 | 0.08 | 800 | 2.1 |
| Lint Mat C/ Linter Paper/ Lint Mat C/ Linter Paper | 3000.0 | 3.76 | 0.08 | 2100 | 1.0 |
| Commerical Product T | 1000.0 | 5.40 | 0.02 | 130 | 100.0 |
| Product L | 990.0 | 0.60 | 0.16 | 130 | 102.4 |
| Product W | 800.0 | 1.00 | 0.08 | 130 | 23.1 |
| Product H | 1306.0 | 1.50 | 0.09 | 130 | 27.9 |

(Note):
(A), (B), and (C) have the same meaning as in Table 2; (D): the concentration of Heavy Oil A in the waste water before the filtration treatment; and (E): The concentration of the same oil in the waste water after the filtration treatment.

As is clear from the results shown in Table 5, the cleaning power of the oil adsorbents of this invention was much higher than those of the commercial products and, in particular, when the Lint Mat and linter paper were used together according to a preferred embodiment of this invention, almost complete cleaning effect for the waste water could be achieved.

EXAMPLE 4

A cleaning test of the oil adsorbents for a sample waste water containing engine oil was conducted.

That is, a sample waste water containing 700 p.p.m. of an engine oil was prepared in the same manner as in Example 3 and 1000 ml of the waste water was treated with filter layer composed of a pile of Lint Mat C, a linter paper, Lint Mat C, and a linter paper in the same manner as shown in Example 3. The results obtained are shown in Table 6 below.

Table 6

| Adsorbent | Property of Mat | | | Filltration | |
|---|---|---|---|---|---|
| | (A) g/m² | (B) cm | (C) g/cm³ | (D) ppm | (E) ppm |
| Lint Mat C/ linter paper/ Lint Mat C/ linter paper | 3000 | 3.76 | 0.08 | 700 | 5.0 |

(Note):
(A), (B), and (C) have the same meaning as in Table 2, (D): The concentration of engine oil in the waste water before filtration and (E): The concentration of engine oil in the waste water after treatment.

From the results in Table 6, it can be understood that the oil adsorbent of this invention has very excellent oil adsorptive capability for engine oil.

EXAMPLE 5

(a) In this example, the adsorptivity of the oil adsorbents of this invention mainly comprising the crude linters for various oils was tested and also compared with those of commercially available oil adsorbents. The results obtained are shown in Table 7. In each test, the weight of each test sample of the oil adsorbent used was 0.38 g.

Table 7

| Adsorbent | Oil Adsorptivity | | | |
|---|---|---|---|---|
| | Kerosene | Turbine Oil | Heavy Oil A | Heavy Oil C |
| Crude Linter Only | 1347 | 1611 | 1347 | 2005 |
| Crude Linter Mat A | 1216 | 1742 | 1610 | 1874 |
| Crude Linter Mat B | 1481 | 1479 | 1447 | 1532 |
| Crude Linter Mat C | 953 | 1344 | 1332 | 1622 |
| Commercial Product L | 611 | 663 | 579 | 637 |
| Produt T | 742 | 1058 | 795 | 1189 |
| Product W | 584 | 853 | 953 | 1216 |

The oil adsorptivity in each case was measured after the mat of the oil adsorbent was unfastened and thus the oil adsorptivity was that of the element itself.

The compositions of the oil adsorbents used in this example were as follows:

Crude Linter Mat A: 80% crude linter and 20% ethylenevinyl acetate copolymer fibers.

Crude Linter Mat B: 90% crude linter and 10% polyethylene fibers.

Crude Linter Mat G: 80% crude linter and 20% polypropylene fibers.

Commercial Products L, T, and W were the same as in Example 1.

The oil adsorptivity was obtained as follows: Each of the oils was placed in a container with the waste liquid, the test sample was, after weighing accurately, floated on the waste liquid, and after the entire surface of the test sample was saturated, the test sample was further allowed to stand in that state for 5 minutes. The test sample was then withdrawn therefrom, placed on a metal netting, allowed to stand for 5 minutes, and then the weight of the test sample was accurately measured. The adsorptivity was calculated from the following relationship.

$$\text{Adsorptivity:} \frac{W_2 - W_1}{W_1} \times 100$$

$W_1$: the weight of the initial test sample.
$W_2$: the weight of the test sample after the saturated test sample was allowed to stand for 5 minutes.

As is clear from the results shown in Table 7 above, the adsorptivities of the fibrous materials used in this invention were much higher than those of the commercial products. In particular, it can be understood that the oil adsorbents of this invention, i.e., the crude linter only and the crude linter mat A had the following excellent oil adsorptivity as compared with the dry nonwoven fabric comprising polypropylene fibers which showed the highest oil adsorptivity of the above-described commercial products.

| Kind of Oil | Crude Linter Only | Crude Linter Mat A |
|---|---|---|
| Kerosene | 1.8 times | 1.6 times |
| Turbine Oil | 1.5 times | 1.6 times |
| Heavy Oil A | 1.7 times | 2.0 times |
| Heavy Oil C | 1.7 times | 1.6 times |

The reason why the crude linters have excellent oil adsorptivity as compared with conventional oil adsorbents comprising synthetic fibers is that while conventional oil adsorbents adsorb the oil on the surfaces of the fibers only due to the oleophilic property of the fibers themselves, in case of the crude linters, the oil is adsorbed on the surface of the fibers and also the oil permeates into the inside of the fibers by capillary action and is adsorbed there since the fibers have a crimped hollow structure.

(b) Heavy Oil B was added to sea water in vat and Crude Linter Mat B was added thereto together with Commercial Products L, T, and W and then the dimensional deformation (shown by swelling percentage) of these materials when they adsorbed oil completely as well as whether they deposited or not and whether their form when simulated waves were made in the sea water for several days were tested. The results were as follows:

The swelling percentage (the area ratio of the sample before and after the adsorption of oil) of the samples directly after the oil adsorption are as follows:

| Crude Linter Mat B: | 0.05% |
|---|---|
| Commercial Product L: | 0.31% |
| Commercial Product T: | 0.18% |
| Commercial Product W: | 0.09% |

The crude linters of this invention had a low swelling percentage, and each of the oil adsorbents tested exhibited no deposition, no dimensional deformation, and no oil desorption when they were tested for 14 days as described above.

(c) Solubility Testing in Gasoline;

A dissolution test of Crude Linter Mat A and Crude Linter Mat C of this invention in gasoline (aromatic) was carried out and it was confirmed that each of the samples was not dissolved in gasoline, and was not deformed in gasoline. On the other hand, the forms of Commercial Products L and T were destroyed in gasoline.

(d) Oil Adsorption Capability on the Surface of the Sea:

The measurement results shown in Table 7 are those for the oil adsorption test for oil adsorbents at the surface of the oil only but in this example, the adsorption test for oil spread on the sea surface was carried out. Since oil spread on sea water usually forms a thin oil layer on the surface, the test was carried out as follows: that is, 150 ml of Heavy Oil B was poured onto sea water contained in a vat of an area of 28 cm × 22 cm to form a thin layer of the oil on the surface and a test sample (area: 10 cm × 10 cm) of this invention was floated thereon. Then, the adsorbed amount of the oil and the time required for adsorbing the oil were measured, respectively. The results obtained are shown in Table 8.

Table 8

| Adsorbent | Property of Mat (A) g/m² | (B) cm | (C) g/cm³ | Adsorbed Amount of Oil g/g | g/cm³ | Time Required for Adsorbing Oil (sec.) |
|---|---|---|---|---|---|---|
| Crude Linter | | | | | | |
| Mat A | 593 | 0.72 | 0.08 | 15.02 | 1.32 | 4' 30" |
| Mat A | 542 | 0.44 | 0.12 | 12.28 | 1.64 | 2' 40" |
| Mat A | 532 | 0.21 | 0.25 | 4.45 | 1.38 | 30" |

From the results shown in Table 8 above, it can be seen that the period of time required for adsorbing the oil increased as the density of the mat decreased.

As synthetic polymers used as the binder for the cotton mixture of this invention, there are polypropylene, polyethylene, an ethylene-vinyl acetate copolymer, polyurethane, polyester, nylon, polyvinyl alcohol, etc., and as semi-synthetic polymers used for the same purpose, there are cellulose acetate polymers but, in particular, polypropylene and an ethylene-vinyl acetate copolymer are most suitable.

The standard Heavy Oil C used in the test had a specific gravity of 0.96 to 0.97 at 15° C and a kinematic viscosity of 100 to 150 CTS (centistokes) (at 50° C)

EXAMPLE 6

The properties of the crude linters and the crude linter mats of this invention as well as of commercially available mats were tested according to the property test method for oil adsorbents defined by the regulations of the Ministry of Transportation of Japan and the results obtained are shown in Table 9 below.

In this case, the measurement methods for the adsorbed amount of oil and the adsorbed amount of water were the same as those in Example 1.

Table 9

| Adsorbent | Property of Mat Basis Weight g/m² | Thickness cm | Density g/cm³ | Absorbed Amount of Oil (Heavy Oil B) g/g | g/cm³ | Adsorbed Amount of Water g/g | g/cm³ | Tensile Test of Original Sample kg/2.5cm width | kg/2.5cm² width | Tensile Test of Sample Containing Oil kg/2.5cm. width | kg/cm² |
|---|---|---|---|---|---|---|---|---|---|---|---|
| Crude Linters | 500 | 0.71 | 0.070 | 15.00 | 1.05 | 0.160 | 0.0112 | — | — | — | — |
|  | 538 | 0.97 | 0.056 | 18.33 | 1.02 | 0.160 | 0.0090 | 0.7 | 0.29 | 0.8 | 0.33 |
| Crude Linter Mat A (containing 20% E.V.A.) | 390 | 0.38 | 0.103 | 16.23 | 1.67 | 0.140 | 0.0140 | 0.7 | 0.74 | 0.6 | 0.63 |
|  | 402 | 0.25 | 0.161 | 9.20 | 1.48 | 0.180 | 0.0280 | 0.5 | 0.80 | 0.4 | 0.64 |
|  | 566 | 0.16 | 0.355 | 6.12 | 2.17 | 0.210 | 0.0760 | 2.2 | 5.50 | 1.0 | 2.50 |
|  | 350 | 0.54 | 0.065 | 22.85 | 1.48 | 0.029 | 0.0019 | — | — | — | — |
| Crude Linter Mat A (containing 10% P.E.) | 340 | 0.25 | 0.136 | 14.29 | 1.98 | 0.073 | 0.0286 | — | — | — | — |
|  | 363 | 0.12 | 0.302 | 9.47 | 2.86 | 0.250 | 0.0830 | — | — | — | — |
| Crude Linter Mat C | 597 | 1.01 | 0.059 | 15.25 | 0.90 | 0.180 | 0.0100 | 1.5 | 0.59 | 0.9 | 0.39 |
|  | 739 | 0.60 | 0.123 | 11.61 | 1.43 | 0.097 | 0.0120 | 1.0 | 0.67 | 0.7 | 0.47 |

Table 9-continued

| Adsorbent | Property of Mat Basis Weight g/m² | Thickness cm | Density g/cm³ | Absorbed Amount of Oil (Heavy Oil B) g/g | g/m³ | Absorbed Amount of Water g/g | g/cm³ | Tensile Test of Original Sample kg/2.5cm. width | kg/2.5cm² width | Tensile Test of Sample Containing Oil kg/2.5cm. width | kg/cm² |
|---|---|---|---|---|---|---|---|---|---|---|---|
| (containing 20% P.P.) | 488 | 0.27 | 0.181 | 7.81 | 1.41 | 0.100 | 0.0160 | 0.7 | 1.04 | 0.4 | 0.59 |
| Commercial Product | | | | | | | | | | | |
| T | 496 | 0.17 | 0.292 | 4.65 | 1.36 | 0.180 | 0.0500 | 3.1 | 7.29 | 1.8 | 4.20 |
| L | 400 | 0.40 | 0.100 | 10.25 | 1.03 | 0.244 | 0.0250 | 3.0 | 3.00 | 0.9 | 0.90 |
| W | 860 | 0.50 | 0.172 | 5.74 | 0.99 | 0.142 | 0.0206 | 2.0 | 1.60 | 0.6 | 0.48 |
| | 800 | 1.00 | 0.080 | 9.00 | 0.72 | 0.087 | 0.0100 | 3.0 | 1.20 | 0.7 | 0.28 |
| Standard | — | — | — | above 6.0 | above 0.8 | below 1.5 | below 0.1 | — | — | — | — |

(Commercial Products T, L, and W were the same as those in Table I)
(E.V.A.): Ethylene vinyl acetate copolymer fibers
(P.E.): Polyethylene fibers
(P.P.): Polypropyrene fibers The measurement of the tensile strength was performed using a test sample of an area of 25 cm × 8 cm at a tensile speed of 8 cm/min., a grip distance of 6 cm., and a temperature of 20° C.

The results in Table 9 above demonstrate the following (a) Crude Linter Mats A, B and C of this invention showed values higher than the standard values of the regulations of the Ministry of Transportation of Japan and thus are superior to the commercial products.

(b) The adsorbed amounts of oil per weight and per volume of the oil adsorbent of this invention are inversely proportional to the density thereof but it is preferred that the mat used as the oil adsorbent has a density of 0.05 to 0.20 g/cm³.

(c) The amount of water adsorbed by the oil adsorbents of this invention is much lower than the standard value.

(d) The oil adsorbents of this invention were inferior to the commercial products in tensile strength in the oil-free state but there was no difference between them in the oil-adsorbed state on practical use. That is, the oil adsorbents of this invention had sufficient tensile strength at use.

In addition, for making the mats of this invention, it is preferred that the synthetic polymers used as the binder have a melting point of about 120° C for polyethylene fibers, about 100° to about 140° C for ethylene-vinyl acetate fibers, and about 150° to about 170° C for polypropylene fibers.

EXAMPLE 7

Water containing 130 ppm of Heavy Oil A was stirred for one minute using a homogenizer at a speed of 7000 r.p.m. to forcibly disperse the oil in water to provide a sample waste water and using the waste water, the cleaning power of the oil adsorbents was measured. The results obtained are shown in Table 10 below.

The sample waste water prepared above corresponded to a waste water containing a low concentration of the oil in a comparatively unstable dispersed oil droplet state. The waste water was treated as follows: that is, each of the mats shown in Table 10 was placed on a support in a porcelain column of a diameter of 130 mm, and 1000 ml of the sample waste water was passed through the mat as a filter layer. The content of the oil in the treated water was measured according to the method for measuring n-hexane extracted materials described in JIS K 0102 "Industrial Waste Water Test Method". Also, a comparative test was carried out using a commercially available oil adsorbent cut and filled into the column as above. The compositions of the oil adsorbents used in this example are shown below:

Crude Linter Mat O: 100% crude linters.
Crude Linter Mat A: 90% crude linters and 10% ethylenepropylene copolymer fibers.
Crude Linter Mat B: 80% crude linters and 20% ethylene propylene fibers.
Crude Linter Mat C: 70% crude linters and 30% ethylene propylene copolymer fibers
Crude Linter Mat D: 80% crude linters and 20% ethylenevinyl acetate copolymer fibers.
Commercial Products: Same as those used in Example 1.

In addition, the thickness and the density of the mats were measured under a load of 7 g per square centimeter.

Table 10

| Adsorbent | Property of Mat (A) g/m² | (B) cm | (C) g/cm³ | Filtration Treatment (F) ml/min. | (G) ppm |
|---|---|---|---|---|---|
| Crude Linter Mat O | 1000.0 | 1.25 | 0.08 | 460 | 20.0 |
| Crude Linter Mat A | 571.4 | 0.71 | 0.08 | 750 | 2.0 |
| " | 573.3 | 0.38 | 0.15 | 1200 | 4.4 |
| Crude Linter Mat B | 570.0 | 0.70 | 0.08 | 850 | 1.3 |
| " | 728.9 | 0.91 | 0.08 | 660 | 1.2 |
| " | 964.4 | 1.02 | 0.08 | — | 0.9 |
| " | 507.8 | 0.34 | 0.15 | 1000 | 4.3 |
| " | 1026.7 | 0.68 | 0.15 | — | 1.4 |
| Crude Linter Mat C | 560.0 | 0.70 | 0.08 | 660 | 5.5 |
| " | 568.9 | 0.38 | 0.15 | 1200 | 7.2 |
| Crude Linter Mat D | 570.0 | 0.70 | 0.08 | 1490 | 8.2 |
| Commercial Product W | 800.0 | 1.00 | 0.08 | 660 | 23.1 |
| Product L | 990.0 | 0.60 | 0.16 | 750 | 102.4 |
| Product T | 1000.0 | 5.40 | 0.02 | 1490 | 100.0 |

In Table 10, (A), (B), and (C) have the same meaning as in Table 2, (F) is the flow rate of the waste water, and (G) is the concentration of the oil in the treated water.

EXAMPLE 8

Three kinds of sample waste waters were treated with oil adsorbents in this example.

That is, three kinds of sample waste waters containing 800 ppm of Heavy Oil A, 2100 ppm of Heavy Oil A, and 600 ppm of a cleaning oil (kerosene #2), respectively, were prepared in the same manner as in Example 7 and 1000 ml of each of the waste waters thus prepared was treated using a filter layer composed of the oil adsorbent as shown in Table 11 as in Example 11. The results obtained are shown in Table 11 below.

Table 11

| Adsorbent | Property of Mat | | | Filtration Treatment | | |
|---|---|---|---|---|---|---|
| | (A) g/m² | (B) cm | (C) g/cm³ | (D) ppm | (F) ml/min. | (G) ppm |
| Crude Linter Mat D | 620 | 0.77 | 0.08 | 800* | 2000 | 8.8 |
| Crude Linter Mat D/Linter Paper | 625 | 0.78 | 0.08 | 800* | 1490 | 6.6 |
| Crude Linter Mat B/Linter Paper | 2000 | 2.50 | 0.08 | 800* | 546 | 2.1 |
| Crude Linter Mat B/Linter Paper (FeSO₄ 20 ppm)*** | 2000 | 2.50 | 0.08 | 800* | 599 | 0.2 |
| Crude Linter Mat D/Linter Paper/ Crude Linter Mat D/Linter Paper | 1500 × 2 | 1.88 × 2 | 0.08 | 2100* | 750 | 5.1 |
| Crude Linter Mat B/Linter Paper/ Crude Linter Mat B/Linter Paper | 1500 × 2 | 1.88 × 2 | 0.08 | 2100* | 667 | 2.0 |
| Crude Linter Mat B/Linter Paper/ Crude Linter Mat B/Linter Paper (FeSO₄ 20 ppm)*** | 1500 × 2 | 1.88 × 2 | 0.08 | 2100* | 667 | 0.5 |
| Crude Linter Mat D/Linter Paper | 630 | 0.79 | 0.08 | 600** | 2000 | 3.5 |
| Crude Linter Mat B/Linter Paper | 3000 | 3.75 | 0.08 | 600** | 677 | 1.2 |
| Crude Linter Mat B/Linter Paper (FeSO₄ 20 ppm)*** | 3000 | 3.75 | 0.08 | 600** | 667 | 0.7 |

*Heavy Oil A
**Cleaning Oil
***20 ppm of FeSO₄ was added into the model waste water as an oil-drop flocculating agent and then treated with the adsorbent As is apparent from Table 11, addition of FeSO₄ remarkably decreases the concentration of the oil in the treated water in comparison with no addition of FeSO₄ (for example, in using Crude Linter Mat D/Linter Paper, the concentration of the oil in the treated water was decreased from 2.1 ppm to 0.2 ppm by the use of FeSO₄).

In Table 11, (A), (B), and (C) have the same meaning as in Table 2, (D) is the concentration of the oil in the waste water, (F) is the flow rate of the waste water treated, and (G) is the concentration of the oil in the treated water.

In addition, the expressions "Crude Linter Mat/Linter Paper, Crude Linter Mat/Linter Paper/Crude Linter Mat/Linter Paper, etc." in the above table have the same meaning as in Table 5.

EXAMPLE 9

Three kinds of sample waste waters were treated with oil adsorbents in this example.

That is, three kinds of sample waste waters containing 900 ppm of a lubricant oil (Daphne Mechanic Oil 75, made by Idemitsu Kosan K.K.), 900 ppm of a cutting oil (Daphne Cut TA-35, made by Idemitsu Kosan K.K.), and 700 ppm of an engine oil (PANXSE 10 W-40, made by Nippon Sekiyu K.K.), respectively, and each of the waste waters was treated in the manner as in Example 7.

The sample waste waters used in this example corresponded to waste waters having a high content of oil and containing comparatively stable emulsified oil droplets. The results obtained are shown in Table 12 below.

Table 12

| Adsorbent | Property of Mat | | | Filtration Treatment | | |
|---|---|---|---|---|---|---|
| | (A) g/m² | (B) cm | (C) g/cm³ | (D) ppm | (F) ml/min | (G) ppm |
| Crude Linter Mat D/Linter Paper | 720 | 0.90 | 0.08 | 900* | 850 | 9.9 |
| Crude Linter Mat B/Linter Paper/ Crude Linter Mat B/Linter Paper | 1500 × 2 | 1.88 × 2 | 0.08 | 900* | 850 | 1.8 |
| Crude Linter Mat B/Linter Paper/ Crude Linter Mat B/Linter Paper (FeSO₄ 20 ppm) | 1500 × 2 | 1.88 × 2 | 0.08 | 900* | 850 | 0.8 |
| Crude Linter Mat D/Linter Paper | 720 | 0.90 | 0.08 | 900* | 850 | 9.3 |
| Crude Linter Mat B/Linter Paper/ Crude Linter Mat B/Linter Paper | 1500 × 2 | 1.88 × 2 | 0.08 | 900** | 600 | 2.4 |
| Crude Linter Mat B/Linter Paper/ Crude Linter Mat B/Linter Paper (FeSO₄ 20 ppm)**** | 1500 × 2 | 1.88 × 2 | 0.08 | 900** | 600 | 0.9 |
| Crude Linter Mat E | 3000 | 3.75 | 0.08 | 700*** | 1000 | 10.0 |
| Crude Linter Mat E/Linter Paper | 3000 | 3.75 | 0.08 | 700*** | 1000 | 8.0 |
| Crude Linter Mat E/Linter Paper | 3000 | 3.75 | 0.08 | 700*** | 1000 | 4.0 |
| Crude Linter Mat B/Linter Paper/ Crude Linter Mat B/Linter Paper | 1500 × 2 | 1.88 × 2 | 0.08 | 700*** | 600 | 3.7 |
| Crude Linter Mat B/Linter Paper/ Crude Linter Mat B/Linter Paper (FeSO₄ 20 ppm)**** | 1500 × 2 | 1.88 × 2 | 0.08 | 700*** | 600 | 1.8 |

*Lubricating Oil
**Cutting Oil
***Engine Oil
****20 ppm of FeSO₄ was added into the model waste water as an oil-drop flocculating agent and then treated with the adsorbent In the above Table, (A), (B), (C), (D), (F) and (G) have the same meaning as in Table 11.

As is apparent from Table 12, addition of FeSO₄ remarkably decreased the concentration of the oil in the treated waste water in comparison with no addition of FeSO₄.

In addition, the composition of Crude Linter Mat E used in this example was as follows:

Crude Liter Mat E: 80% crude linters and 20% refined linters.

EXAMPLE 10

A sample waste water containing a non-aqueous material was prepared and treated with the oil adsorbent of this invention.

That is, as in Example 7, a sample waste water containing 2812 ppm of ethylbenzene was prepared and was treated with a filter layer of the oil adsorbent of this invention. In this example, the measurement of the content of the oil in the treated water was made by gas chromatography. The results obtained are shown in Table 13 below.

Table 13

| Adsorbent | Property of Mat | | | Filtration Treatment | | |
|---|---|---|---|---|---|---|
| | (A) g/m$^2$ | (B) cm | (C) g/cm$^3$ | (D) ppm | (F) ml/min. | (G) ppm |
| Crude Linter Mat B/Linter Paper | 3000 | 3.75 | 0.08 | 2812 | 2000 | 160 |

In the above Table, (A), (B), (C), (D), (F) and (G) have the same meaning as in Table 11.

EXAMPLE 11

A sample waste water containing 130 p.p.m. of Heavy Oil A was prepared in a same manner as in Example 7 and treated using a filter layer composed of the oil adsorbent as shown in Table 14. The results obtained are shown in Table 14 below.

Table 14

| Adsorbent | Property of Mat | | | Filtration Treatment | |
|---|---|---|---|---|---|
| | (A) g/m$^2$ | (B) cm | (C) g/cm$^3$ | (F) ml/min. | (G) ppm |
| Crude Linter Mat E | 2000 | 2.50 | 0.08 | 750 | 0.9 |
| Crude Linter Mat B | 2000 | 2.50 | 0.08 | 600 | 1.5 |

In the above Table, (A), (B), (C), (F) and (G) have the same meaning as in Table 11. Further, Crude Linter Mat E has same composition as Crude Linter Mat B (i.e., 80% crude linters and 20% ethylene propylene fibers), but Crude Linter Mat E is arranged in such a manner that the fiber axes of the crude linters are aligned in substantially the same direction of the fiber axes.

By using the Crude Linter Mat E in combination with the Linter Paper as described in Example 3, the oil adsorbability is even more effective.

While the invention has been described in detail and with reference to specific embodiments thereof, it will be apparent to one skilled in the art that various changes and modifications can be made therein without departing from the spirit and scope thereof.

What is claimed is:

1. A process for treating oil-containing waste water which comprises treating the oil-containing waste water with an oil adsorbent comprising unrefined crude lints or crude linters, said crude lints and crude linters containing about 0.3 to about 3% by weight cotton wax.

2. The process of treating oil-containing waste water as claimed in claim 1, wherein said treating of the waste water with the oil adsorbent comprising unrefined crude lints or crude linters is treating such together with a filter paper or filter papers, said crude lints and crude linters containing about 0.3 to about 3% by weight cotton wax.

3. The process of treating an oil-containing waste water as claimed in claim 2, wherein the waste water is uniformly permeated into and is treated by an oil adsorbent comprising a mixture of unrefined crude lints or crude linters and about 10 to about 30% by weight of at least one of thermoplastic synthetic fibers and semi-synthetic fibers.

4. The process of treating an oil-containing waste water as claimed in claim 3, wherein said thermoplastic synthetic fibers or semi-synthetic fibers are selected from the group consisting of polypropylene fibers, polyethylene fibers, ethylenevinyl acetate copolymer fibers, ethylene-propylene copolymer fibers or cellulose acetate fibers.

5. The process of treating an oil-containing waste water as claimed in claim 2, wherein the waste water is uniformly permeated into and is treated by an oil adsorbent comprising a fabricated mixture of unrefined crude lints or crude linters in about 5 to about 30% by weight refined natural fibers.

6. The process of treating an oil-containing waste water as claimed in claim 5, wherein said refined natural fibers are selected from the group consisting of refined linters, refined pulps, viscose rayon staple fibers or refined lints.

7. The process of treating an oil-containing waste water as claimed in claim 2, wherein the waste water is treated using an oil adsorbent comprising a fabricated mixture of unrefined crude lints or crude linters and further, refined natural fibers and at least one of thermoplastic synthetic fibers and semi-synthetic fibers in a total amount of about 10 to about 50% by weight.

8. The process of treating an oil-containing waste water as claimed in claim 7, wherein said thermoplastic synthetic fibers or semi-synthetic fibers are selected from the group consisting of polypropylene fibers, polyethylene fibers, ethylenevinyl acetate copolymer fibers, ethylene-propylene copolymer fibers or cellulose acetate fibers.

9. The process of treating an oil-containing waste water as claimed in claim 7, wherein said refined natural fibers are selected from the group consisting of refined linters, refined pulps, viscose rayon stable fibers or refined lints.

10. The process of treating an oil-containing waste water as claimed in claim 2, wherein said one or more filter papers have voids of about 10 to about 70 microns.

11. The process of treating an oil-containing waste water as claimed in claim 1, wherein the waste water is uniformly premeated into and is treated by an oil adsorbent comprising a mixture of unrefined crude lints or crude linters and about 10 to about 30% by weight of at least one of thermoplastic synthetic fibers and semi-synthetic fibers.

12. The process of treating an oil-containing waste water as claimed in claim 11, wherein said thermoplastic synthetic fibers or semi-synthetic fibers are selected from the group consisting of polypropylene fibers, polyethylene fibers, ethylenevinyl acetate copolymer fibers, ethylene-propylene copolymer fibers or cellulose acetate fibers.

13. The process of treating an oil-containing waste water as claimed in claim 1, wherein the waste water is uniformly permeated into and is treated by an oil adsorbent comprising a fabricated mixture of unrefined crude lints or crude linters and about 5 to about 30% by weight refined natural fibers.

14. The process of treating an oil-containing waste water as claimed in claim 13, wherein said refined natural fibers are selected from the group consisting of refined linters, refined pulps, viscose rayon staple fibers or refined lints.

15. The process of treating an oil-containing waste water as claimed in claim 1, wherein the waste water is treated using an oil adsorbent comprising a fabricated mixture of unrefined crude lints or crude linters and further, refined natural fibers and at least one of the thermoplastic synthetic fibers and semi-synthetic fibers in a total amount of about 10 to about 50% by weight.

16. The process of treating an oil-containing waste water as claimed in claim 15, wherein said thermoplastic synthetic fibers or semi-synthetic fibers are selected from the group consisting of polypropylene fibers, polyethylene fibers, ethylenevinyl acetate copolymer fibers, ethylene-propylene copolymer fibers or cellulose acetate fibers.

17. The process of treating an oil-containing waste water as claimed in claim 15, wherein said refined natural fibers are selected from the group consisting of refined linters, refined pulps, viscose rayon staple fibers or refined lints.

18. The process of treating an oil-containing waste water as claimed in claim 1, wherein the oil adsorbent comprising mainly unrefined crude lints or crude linters is arranged in such a manner that the fiber axes of said crude lints or crude linters are aligned in substantially the same direction and the said waste water is passed therethrough in the direction of the fiber axes.

19. The process of treating an oil-containing waste water as claimed in claim 1, wherein the waste water is treated by passing the waste water through a filter layer formed by piling a plurality of oil adsorbent discs comprising mainly unrefined crude lints or crude linters so that the fiber axes thereof are in the same direction, said discs having inserted therebetween and/or at the bottom of the discs one or more filter papers.

20. The process of treating an oil-containing waste water as claimed in claim 19, wherein said one or more filter papers have voids of about 10 to about 70 microns.

* * * * *